United States Patent
Cremona et al.

(10) Patent No.: US 6,683,021 B2
(45) Date of Patent: Jan. 27, 2004

(54) OXIDATION CATALYSTS

(75) Inventors: Alberto Cremona, Castell Arquato (IT); Carlo Rubini, San Fermo Della Battaglia (IT); Edoardo Vogna, Novara (IT)

(73) Assignee: SUD Chemie MT. S.R.L., Milan (IT)

( * ) Notice: Subject to any disclaimer, the term of this patent is extended or adjusted under 35 U.S.C. 154(b) by 57 days.

(21) Appl. No.: 09/968,377

(22) Filed: Oct. 1, 2001

(65) Prior Publication Data

US 2002/0064492 A1 May 30, 2002

(30) Foreign Application Priority Data

Oct. 11, 2000 (IT) ........................ MI2000A2193

(51) Int. Cl.[7] .................. B01J 23/00; B01J 23/32; B01J 23/70; B01J 23/72; B01J 23/08
(52) U.S. Cl. ............... 502/303; 502/324; 502/346; 502/355; 502/415; 502/439
(58) Field of Search ................. 502/302, 303, 502/304, 324, 345, 346, 355, 415, 439, 241, 244, 263

(56) References Cited

U.S. PATENT DOCUMENTS

| | | | |
|---|---|---|---|
| 3,422,167 A | * | 1/1969 | Bowman et al. ............. 264/0.5 |
| 3,715,322 A | * | 2/1973 | Kobayashi et al. ......... 252/454 |
| 3,865,752 A | * | 2/1975 | Remeika et al. ............ 252/462 |
| 3,865,923 A | | 2/1975 | Ruth |
| 3,914,389 A | | 10/1975 | Gottfried |
| 3,948,808 A | * | 4/1976 | Box, Jr. et al. ............. 252/462 |
| 4,045,538 A | | 8/1977 | Sare et al. |
| 4,158,645 A | * | 6/1979 | Magistro .................... 252/462 |
| 4,616,000 A | * | 10/1986 | Mazanec et al. ............ 502/341 |
| 4,820,678 A | * | 4/1989 | Xu .............................. 502/303 |
| 4,968,656 A | * | 11/1990 | Fukuda et al. .............. 502/244 |
| 5,055,440 A | * | 10/1991 | Chu et al. ................... 502/303 |
| 5,093,301 A | * | 3/1992 | Chu et al. ................... 502/303 |
| 5,260,248 A | | 11/1993 | Singh et al. |
| 5,384,301 A | * | 1/1995 | Flytzani-Stephanopoulos et al. ......................... 502/304 |
| 5,414,182 A | * | 5/1995 | Iezzi et al. .................. 585/661 |
| 5,502,019 A | * | 3/1996 | Augustine et al. ......... 502/314 |
| 5,610,117 A | * | 3/1997 | Horiuchi et al. ............ 502/324 |
| 5,691,268 A | * | 11/1997 | Koveal et al. .............. 502/345 |
| 5,972,829 A | * | 10/1999 | Ichimura .................... 502/303 |
| 6,319,876 B1 | * | 11/2001 | Maier ......................... 502/178 |
| 6,489,264 B1 | * | 12/2002 | Isupova et al. ............. 502/302 |

FOREIGN PATENT DOCUMENTS

WO  00 25901  5/2000

* cited by examiner

*Primary Examiner*—Cam N. Nguyen
(74) *Attorney, Agent, or Firm*—Welsh & Katz, Ltd.

(57) ABSTRACT

Oxidation catalysts useful in the oxidation to $CO_2$ and $H_2O$ of volatile organic compounds such as hydrocarbons comprising mixed oxides of copper, manganese and one or more rare-earth metals, wherein the metals can assume multiple valency states, having a percentage composition by weight, expressed as CuO, MnO and rare-earth oxides, in which the metal has the minimum value of 8–50%, 10–75% and 2–15%. The oxides are supported on inert porous inorganic oxides.

5 Claims, No Drawings

OXIDATION CATALYSTS

FIELD OF THE INVENTION

The present invention relates to oxidation catalysts usable in particular for the full oxidation to $CO_2$ and $H_2O$ of volatile organic compounds (VOC) and in the processes in which said catalysts are used.

BACKGROUND OF THE INVENTION

A characteristic of the catalysts is the oxidation of VOC compounds with the selective formation of carbon dioxide only. This is an evident advantage with respect to the known types of oxidation catalyst, in which the combustion of the VOC compounds is accompanied by the formation of CO, which besides being a toxic component implies an energy loss when the combustion of the VOC compounds is used to generate energy.

The known types of oxidation catalyst used for the combustion of VOC compounds are essentially of two types:

a) catalysts based on noble metals: they are characterized by high activity even at relatively low temperatures (250–450° C.), but their cost is very high and is rising considerably owing to the scarcity of the metals and to their increasing demand, entailing problems in using them for applications such as the combustion of VOC compounds;

b) catalysts based on mixed oxides, such as copper chromites and barium hexaluminates, which are far less active than catalysts containing noble metals and require very drastic operating conditions; and catalysts based on rare earth complex oxides, alkaline-earth metals and transition metals (disclosed in U.S. Pat. No. 5,242,881) or having the formula La (1-x) $Sr_x CrO_3$, the latter being also used to treat the emissions of internal-combustion engines (U.S. Pat. No. 5,286,698) or having the formula $Ba_2Cu_3O_6$, which are selective in the oxidation of VOC compounds toward the formation of carbon dioxide, but are highly reactive toward $CO_2$ and therefore tend to passivate irreversibly.

BRIEF DESCRIPTION OF THE INVENTION

The catalysts according to the present invention comprise mixed oxides of Cu, Mn and rare-earth metals, in which the metals can assume multi-valence states, having a composition by weight expressed as the oxides that are specified hereafter: 10 to 75% as MnO, 8 to 50% as CuO, and 2 to 15% as $La_2O_3$ and/or as oxides of the other rare-earth metals at the lowest valence state.

DETAILED DESCRIPTION OF THE INVENTION

Preferably, the composition is 50–60% MnO, 35–40% CuO, 10–12% $La_2O_3$.

The mixed oxides that form the active components of the catalyst have the characteristic of being p-type semiconductors (in these semiconductors, conductivity increases exponentially with the temperature according to an Arrhenius-type law and the charge vectors are electron vacancies). In these oxides, the gaseous oxygen is chemisorbed onto the surface and participates in the oxidation reaction together with the lattice oxygen.

The oxides are supported on porous inorganic carriers such as alumina, silica, silica-alumina, titanium dioxide, magnesium oxide. Gamma alumina, in the form of microspheroidal particles with an average diameter of 30–80 microns, is the preferred carrier for using the catalysts in fluid-bed reactions. For fixed-bed reactions, preference is given to the use of carriers having a definite geometric shape, such as three-lobed cylindrical granules with mutually equidistant through bores at the lobes. The dimensions of the granules are generally from 3 to 10 mm in height, the diameter of their circumscribed circumference is 5 to 10 mm, and the ratio between the geometric area and the volume of the solid part of the granule is greater than 1.3 $mm^{-1}$. The oxides are supported in an amount of generally 5 to 60% by weight, preferably 20–30% by weight.

The catalyst in tablets is prepared by impregnating the carrier initially with a solution of a salt of lanthanum or cerium or of another rare-earth metal, drying the carrier and then calcining it at a temperature around 600° C. The carrier is then impregnated with a solution of a salt of copper and manganese, subsequently drying at 120–200° C. and calcining up to 450° C.

Any soluble salt can be used.

Examples of salts are nitrates, formates and acetates. Lanthanum is used preferably as lanthanum nitrate $La(NO_3)_3$; copper and manganese are preferably used as nitrates, respectively $Cu(NO_3)_2$ and $Mn(NO_3)_3$. The preferred impregnation method is dry impregnation, using an amount of solution equal to, or smaller than, the volume of the pores of the carrier.

As already noted, the catalysts selectively oxidize the VOC compounds to carbon dioxide: this occurs even when working for a limited time with an oxygen deficit with respect to the stoichiometric value required by the oxidation reaction.

With respect to catalysts based on noble metals, the catalysts according to the invention are characterized by greater resistance to sintering.

For example, after treatment at 1000° C. in dry air, while the complete conversion temperature rises slightly for the catalysts according to the invention, it rises considerably for catalysts based on noble metals, owing to the remelting of the surface area caused by sintering of the metal particles that are present on the carrier. The catalysts are preferably used in the treatment of gaseous effluents from plants such as plants for the production of organic compounds, tire manufacture, asphalt blowing, wastewater treatment, and offset printing. The catalysts can also be used in the oxidation of NO and $NO_2$. Another application of particular interest is the purification of gases from reactors for solid-state polycondensation of aromatic polyester resins (the impurities are mainly constituted by ethylene glycol), in which the catalysts are capable of completely oxidizing the impurities, with exclusive formation of carbon dioxide even when using the stoichiometric quantity of oxygen relative to the methane equivalents of the impurities that are present. In tests conducted by continuously feeding a nitrogen stream containing 1600 ppm of ethylene glycol on a fixed bed of the catalyst having the composition given in example 1, it was found that the ethylene glycol is removed quantitatively by using the stoichiometric amount of oxygen (5/2 moles per mole of glycol) working at 310° C. and with a space velocity of 10000 $h^{-1}$. Selectivity to $CO_2$ is complete.

Another application of the catalysts is the catalytic combustion of methane in thermal power stations for generating electricity. In this application, the catalysts have the advantage, with respect to combustion with a catalyst of a known type, that they can operate at lower temperatures, at which NO is not generated: this allows to avoid the post-treatments for removal of this oxide that are instead required with known types of catalyst.

The following examples are provided to illustrate but not to limit the scope of the invention.

EXAMPLE 1

A catalyst supported on gamma alumina is prepared in which the mixed oxides have the following composition, expressed as a percentage by weight of the oxides listed below:

$La_2O_3$=9.3
MnO=53.2
CuO=37.5

The preparation is performed by first impregnating with an aqueous solution of lanthanum nitrate ($La(NO_3)_3$) a gamma alumina carrier which is then dried at 110° C. and calcined at 600° C. Then the carrier is impregnated with an aqueous solution of manganese nitrate ($Mn(NO_3)_3$) and copper nitrate ($Cu(NO_3)_2$). This is followed by drying at 120–200° C. and calcining at 450° C. The carrier is impregnated by using an amount of solution equal to 100% of the volume of the pores of the carrier. The amount of supported oxides is 24.8% by weight. Gamma alumina tablets were used which were shaped like granules having a three-lobed cross-section with mutually equidistant through bores at the lobes, said bores being parallel to the axis of the lobes. The dimensions of the tablets were: height 4 mm, diameter of external circumference 4 mm, bore diameter 2 mm, and wall thickness 1 mm.

The ratio between the geometric area and the volume of the solid space occupied by the tablets was 2.5 $mm^{-1}$.

The tablets were prepared by compression molding. The surface area (BET) of the catalyst thus obtained was 98.8 $m^2/g$; porosity (by nitrogen) was 0.37 $cm^3/g$; apparent density 0.72 $g/cm^3$.

Powdered gamma alumina, in the form of microspheres having an average diameter between 100 and 600 microns, was also used.

The surface area (BET) of the catalyst supported on the microspheroidal alumina was 110.6 $m^2/g$; porosity was 0.40 $cm^3/g$.

The following tests were conducted mainly in a micro-pilot plant suitable to test the combustion of gaseous hydrocarbons at the concentration of several hundred parts per million.

Combustion of N-hexane

Normal-hexane was chosen initially among the most significant reagents to verify the oxidation capabilities of the catalyst for two main reasons:

1) it is a long-chain linear alkane which is particularly resistant to oxidation;
2) it is a solvent which is widely used in various kinds of industry, including for example chemical industry and printing industry.

The intended reaction is:

$$C_6H_{14}+9.5O_2 \rightarrow 6CO_2+7H_2O.$$

The first results were obtained with a powdered catalyst and the main evaluation parameters considered were the light-off activity of the catalyst, i.e., the temperature of the gas stream at which the catalyst burns 50% of the hydrocarbons that are present, and the combustion temperature for 95% conversion. All tests were conducted at the space velocity of 20000 $h^{-1}$, twice that actually used in industrial plants.

The following results were obtained.

| REAGENTS | | 50% conversion | | 95% conversion | |
|---|---|---|---|---|---|
| n-hexane | oxygen (% v/v) | temperature | selectivity | temperature | selectivity |
| 2300 ppm | 3.4% | 300° C. | 100% | 360° C. | 100% |
| 1800 ppm | 3.8% | 285° C. | 100% | 330° C. | 100% |

Pilot-scale tests using the catalyst prepared in adequately ground and screened tablets were conducted under conditions more similar to industrial testing, with the following results:

| REAGENTS | | 50% conversion | | 95% conversion | |
|---|---|---|---|---|---|
| n-hexane | oxygen (% v/v) | temperature | selectivity | temperature | selectivity |
| 320 ppm | 20% | 270° C. | 100% | 320° C. | 100% |

A duration test (total time exceeding 1600 hours) was conducted in conditions closely resembling the conditions of an industrial plant, again by using the catalyst prepared in tablets subsequently ground and screened and by working on a pilot scale. The total flow-rate was set at 200 $cm^3$/minute in order to obtain a concentration of 320 ppm of normal-hexane in air at the space velocity of 20000 $h^{-1}$. The catalyst was initially tested for 850 continuous hours at the temperature of 380° C., with a gas space velocity of 20000 $h^{-1}$ and with a concentration of 300 ppm of normal-hexane in air. Conversion and selectivity values remained at 100% throughout.

In order to check for possible losses in activity of the catalyst at lower temperatures, a light-off test was performed weekly during the duration test. The catalyst was cooled down, in the gas stream itself, to 250° C. and then heated again to the ordinary operating temperature of 380° C. The results always remained stable during the test and showed a slight hysteresis, with light-off temperatures at 255° C. and 270° C., respectively in the cooling step and in the heating step. After five weeks in stationary conditions, the temperature of the test was first raised to 400° C. for 18 hours and then to 420° C. for 72 hours, at the same flow-rate and concentration conditions; the activity of the catalyst did not change in any way even after restoring the original temperature. It was subsequently found that even an operating temperature of 450° C. causes no variation of any kind in the activity of the catalyst. After 950 hours of operation, the space velocity of the gas of the catalyst was doubled to 40000 $h^{-1}$ and the oxygen concentration was decreased to 10% by volume for 18 hours. Conversion and selectivity values both remained throughout at 100% at 380° C. After this, the catalyst was subjected to a gradual reduction of oxygen from 20% to 0% by volume at a constant total flow-rate, in order to determine the lower threshold temperature at which partial combustion products are generated. It has been found that until the value of oxygen remained equal to the stoichiometric quantity required for the combustion of normal-hexane, the conversion and selectivity values both remained at 100%. At a concentration of 3000 ppm of oxygen (88% of the stoichiometric value), conversion dropped to 85.5% and selectivity remained 100%. At approximately half the stoichiometric value of the oxygen, conversion was reduced to 58% and selectivity again remained close to 100%, with the presence of traces of ethylene and hydrogen as products of a dehydrogenation reaction. Finally, the gas mixture containing 360 ppm of normal-hexane in helium and in the absence of oxygen was fed over the catalyst for 30 minutes, keeping unchanged all the other conditions of the reaction. Conversion of the normal-hexane remained at 11% by reaction both with the lattice oxygen of the structure of the solid and with traces of oxygen (approximately 20 ppm) present in the gas stream. The dehydrogenation reaction occurs partially, but neither cracking nor formation of partial oxidation products were observed. It is noted that the presence of carbon monoxide was not detected in any condition of the catalytic test both using a gas chromatograph and with an infrared analyzer.

The duration test conducted with the molecule of normal-hexane lasted over 1600 hours without noting any decay in activity.

Combustion of Phthalates

The exhaust gas of a PVC coating machine was used as sample gas for the combustion in air of the pollutants, using the tableted catalyst on an industrial plant. The polluting gases were identified as acetic acid, propanoic acid, valeric acid and caproic acid (350 mg/Nm$^3$), diisohexyl phthalate (300 mg/Nm$^3$), and isopropyl phthalate (300 mg/Nm$^3$). The total flow-rate of the gases was set to 50 Nm$^3$/h and the space velocity was set to 25000 h$^{-1}$. The test lasted 4 weeks at an average temperature of 380° C.

The results can be summarized as follows:
beginning of test:
83.5% conversion; 100% CO$_2$ selectivity
end of test:
87.0% conversion; 78% CO$_2$ selectivity

Combustion of Propane

In order to perform comparative tests with commercial catalysts based on noble metals, the tableted catalyst was subjected to a test for the combustion of propane (a fundamental component of LPG mixtures) on a micropilot plant.

The intended reaction is as follows:

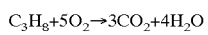

$$C_3H_8 + 5O_2 \rightarrow 3CO_2 + 4H_2O$$

Propane concentration was set to 1400 ppm and oxygen concentration was set to 4.2% by volume at a space velocity of 20000 h$^{-1}$. The light-off value was reached at 377° C., while total conversion was achieved at 465° C. Selectivity always remained at 100%. This performance is comparable to, and in some cases better than, the commercial catalysts based on noble metals that were considered.

Combustion of Ethylene Glycol

In the process for upgrading polyethylene terephthalate (PET), the gases at the outlet of the reactor are passed over a catalytic bed based on a Pt and/or Pd catalyst in order to eliminate organic impurities, mainly ethylene glycol, converting them to CO$_2$ and H$_2$O.

It has been found that the catalyst of the present invention is capable of removing the ethylene glycol (1600 ppm) by using the stoichiometric quantity of oxygen, working continuously at 310° C. and with a space velocity of 10000 h$^{-1}$. The oxidation products were formed exclusively of CO$_2$ and H$_2$O.

Combustion of Methanol

An example of application of catalytic combustion for the removal of impurities of gaseous effluents of chemical plants relates to plants for the production of formaldehyde from methanol.

A typical composition of waste gases is as follows:

| | |
|---|---|
| dimethyl ether | 2300 ppmv |
| formaldehyde | 200 ppmv |
| methanol | 700 ppmv |
| carbon monoxide | 1.6% vol |
| water | 3.2% vol |
| oxygen | 6.5% vol |

Space velocity is approximately 10000 h$^{-1}$.

The temperature for introduction in the combustion reactor is kept at approximately 260–270° C., and the intense exothermic behavior of the various oxidation reactions is capable of creating thermal gradients on the catalytic bed in excess of 200° C. Tests at the space velocity of 20000 h$^{-1}$ were conducted in the micropilot plant with an amount of oxygen which was considerably lower (1.15% v/v) than the one used industrially and with a 1.8% concentration by volume of carbon monoxide and 730 ppmv of methanol. It was found that in these combustion conditions, a temperature of 250° C. of the gas stream entering the bed is sufficient to ensure 100% yield in the combustion of the reagents that are present.

The disclosures in Italian Patent Application No. MI2000A002193 from which this application claims priority are incorporated herein by reference.

What is claimed is:

1. Oxidation catalysts comprising mixed oxides of copper, manganese and one or more rare-earth metals, wherein the metals can assume multiple valence states, having a percentage composition by weight of 35–40% CuO, 50–60% MnO and 10–15% La$_2$O$_3$.

2. The catalysts according to claim 1, wherein the mixed oxides are supported on inert porous inorganic carriers.

3. The catalysts according to claim 2, wherein the carrier has a porosity of more than 0.3 cm$^3$/g and a surface area of more than 30 m$^2$/g and is selected from the group consisting of alumina, silica and silica-alumina.

4. The catalysts according to claim 3, wherein the alumina is gamma alumina in the form of microspheroidal particles or of single- or three-lobed cylindrical rings provided with through bores with geometric area/solid volume ratio of more than 1.3 mm$^{-1}$.

5. The catalysts according to claim 2, wherein the amount of supported mixed oxides is from 5 to 60% by weight.

* * * * *